No. 612,573. Patented Oct. 18, 1898.
N. B. ROSS.
VOTING MACHINE.
(Application filed Feb. 20, 1897.)
(No Model.) 4 Sheets—Sheet 1.
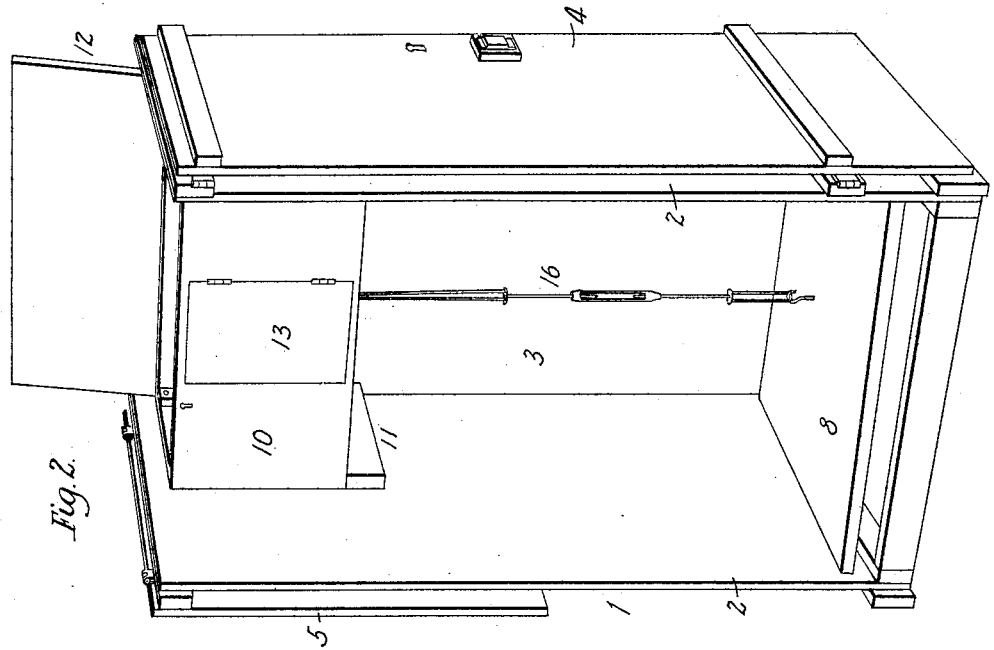
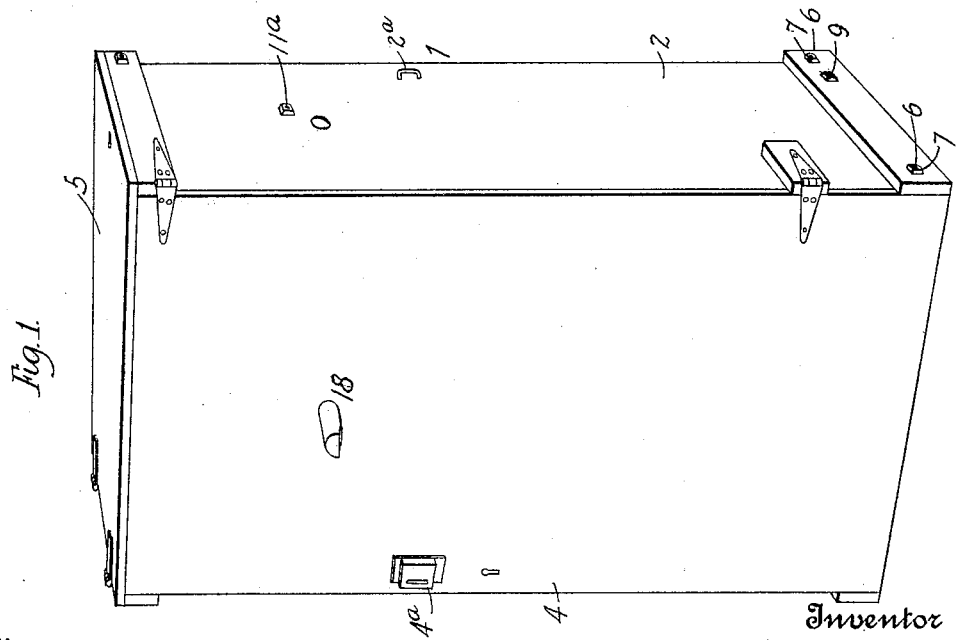
Witnesses
Inventor
Napoleon B. Ross
By W. W. Dudley
his Attorneys No. 612,573. Patented Oct. 18, 1898.
N. B. ROSS.
VOTING MACHINE.
(Application filed Feb. 20, 1897.)
(No Model.) 4 Sheets—Sheet 2.
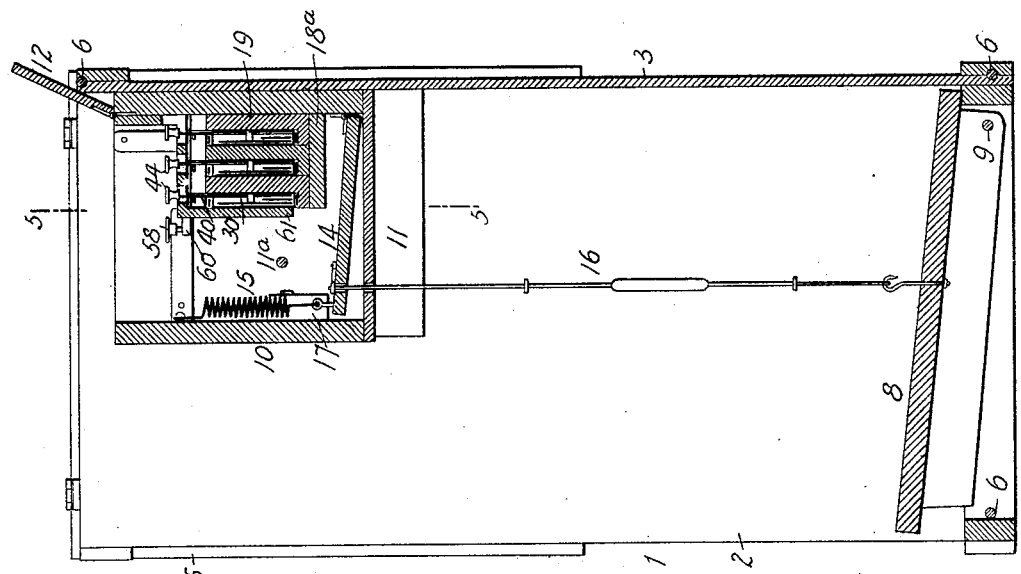
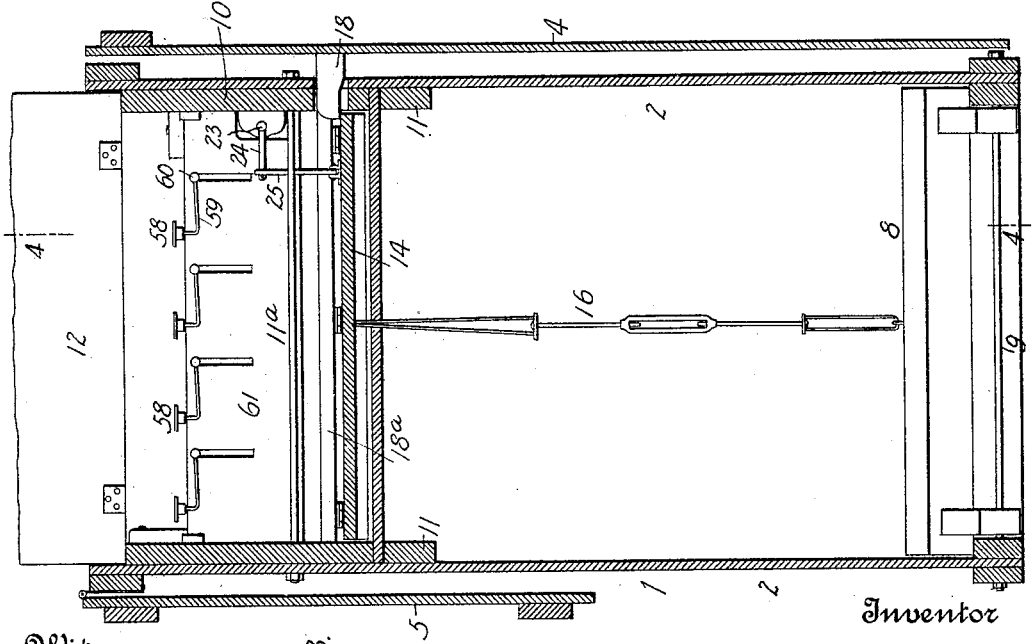
Witnesses
Inventor
Napoleon B. Ross
By W. W. Dudley &Co
his Attorneys

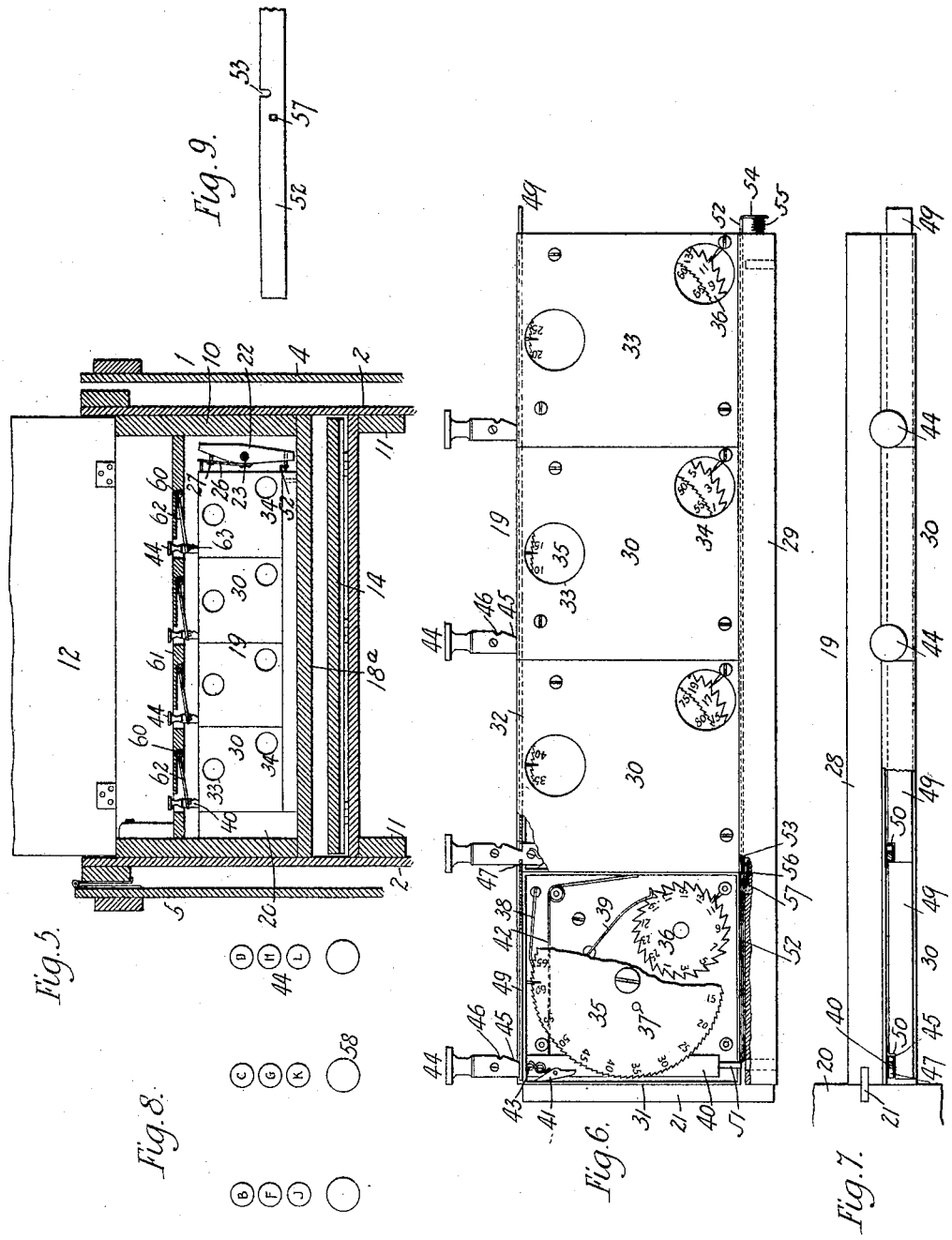

No. 612,573. Patented Oct. 18, 1898.
N. B. ROSS.
VOTING MACHINE.
(Application filed Feb. 20, 1897.)
(No Model.) 4 Sheets—Sheet 4.
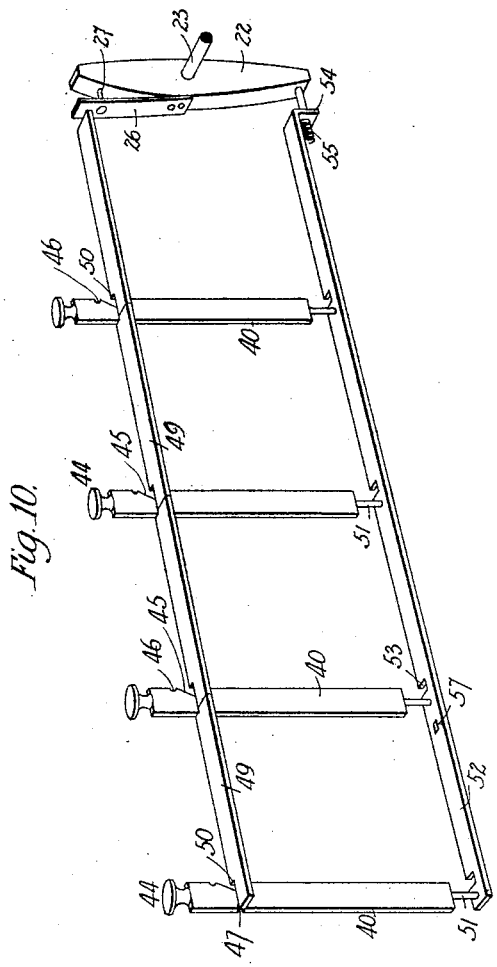
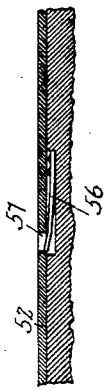
WITNESSES
INVENTOR
Napoleon B. Ross
By W. W. Dudley & Co
his Attorneys

UNITED STATES PATENT OFFICE.

NAPOLEON B. ROSS, OF GILBOA, OHIO.

VOTING-MACHINE.

SPECIFICATION forming part of Letters Patent No. 612,573, dated October 18, 1898.

Application filed February 20, 1897. Serial No. 624,473. (No model.)

*To all whom it may concern:*

Be it known that I, NAPOLEON B. ROSS, a citizen of the United States, residing at Gilboa, in the county of Putnam and State of Ohio, have invented certain new and useful Improvements in Voting-Machines; and I do hereby declare that the following is a full, clear, and exact description of the invention, which will enable others skilled in the art to which it appertains to use the same.

This invention relates to registering appliances and is directed more particularly to improvements in or pertaining to voting-machines, although certain of the parts are equally adapted for employment in connection with appliances in which registrations other than of votes are to be effected.

The primary object of my invention is to obtain in a machine of this character such precision of action as will preclude improper registrations made either through manual acts or through disorder of the parts, it being essential to the proper working of such machines that reliable safeguards be provided both against persons who may seek to alter the true results and against the possibility of the operation of the machine becoming impaired.

Another object of my invention is to so simplify the operation of such machines as to enable persons of even less than ordinary intelligence to perform the proper manipulations and to cast their votes for the candidate or candidates only they desire to support.

Another object of my invention is to provide a simple and comparatively inexpensive construction of machine which can be readily transported and set up in position for operation, which can be occupied for the purpose of voting by but one person at a time, and which will obtain absolute secrecy of the ballot.

My invention consists in certain details of construction and relative arrangement and operation of parts, the nature of which will be ascertained from a reading of the following description in connection with the accompanying drawings, in which—

Figure 1 is a perspective view of my improved registering appliance in a closed condition. Fig. 2 is a perspective view showing the registering appliance open and in a condition for use. Fig. 3 is a vertical sectional view taken transversely through the appliance. Fig. 4 is a vertical sectional view taken on line 4 4 of Fig. 3. Fig. 5 is a sectional view taken on line 5 5 of Fig. 4. Fig. 6 is an enlarged elevation of one of the register-cases containing four registering mechanisms, one of said mechanisms being uncovered to show its parts. Fig. 7 is a top view of the cases in position with a portion of the top of one case broken away to show the locking-bars. Fig. 8 is a view showing an arrangement of the keys. Fig. 9 is a plan view of a portion of the locking-plate. Fig. 10 is a detail perspective view of the key-bars and the locking mechanism therefor. Fig. 11 is a detail sectional view of one of the locking-bars and its spring-catch.

Referring to the said drawings by numerals, 1 denotes an outer casing which incloses all of the parts, said casing comprising the sides 2 2, the back 3, the front 4, which constitutes a door and is hinged at one side to one of the sides 2, and the top 5, which is in the nature of a cover, being hinged to the opposite side 2 and adapted to be folded over, as shown in Fig. 2. The door 4 is provided on its outer side with a lock 4ª, which is adapted to coöperate with a staple 2ª on the side 2 to lock said door when in its folded position. For convenience in transportation and for storing the casing is made in readily-separable parts, which may be knocked down into a small compass, and to assemble and secure the parts together I employ threaded bolt-rods 6 6 and nuts 7 7, which rods are passed transversely through the structure. In the lower portion of the casing is a platform 8, hinged at its inner side on a pintle-rod 9, and this platform is normally tilted in an upward direction, but is adapted to be depressed by the weight of a person standing thereon, for a purpose to be presently explained.

In the upper portion of the casing is a box 10, supported by blocks 11 11 on the inner sides of the casing and held to place by a bolt-rod 11ª, and said box is provided with a hinged cover 12 for its top and with a hinged door 13 in its front. Key or other suitable locks are provided for the cover 12 and also for the door 4 and cover 5 of the casing, and such locks are provided each with preferably a different key, the keys being retained separately by the persons in authority, with the view of precluding access to the machine other than by the coöperation of such persons.

In the lower portion of the box is provided a plate 14, which is hinged at its rear side and is normally tilted upwardly at its front by the action of a coiled spring or springs 15, which are secured at one end to the front of the plate and at the other end to the inner side of the box-front. A rod 16 connects this plate with the platform 8, being provided at its ends with eyes, one of which engages a hook on the platform and the other of which is passed through slots in the box-bottom and in the plate and is engaged by a hook or other device on said plate. The rod connection between the plate and platform insures the normal tilted position of the latter by the action of the springs, which are sufficiently stout to restore these devices to their normal positions when the weight of the operator is removed from the platform. The rod is provided with a turnbuckle for adjustment. On the inner side of the box-front is pivotally secured a stop-arm 17, which when in a vertical position operates to check the upward movement of the plate. This arm being turned allows of the plate being raised by the action of the springs beyond the point fixed by the stop, for a purpose to be presently explained. To control the upward limit of the movement of the plate when the machine is in operation, I provide a stop-button 18, which is carried by the door 4 of the casing, which stop-button when said door is swung around against the side 2 enters an aperture in said side and projects inward therefrom into the path of the plate, as shown. To insure the described position of the stop-button during the operation of the machine, an additional lock for the door 4 is provided, which secures the door after it has been swung around against the side of the casing, or, in other words, to the position shown in Fig. 2.

In the lower portion of the box, above the plate 14, is a shelf 18ª, which supports a number of register-cases 19 19, of which three are shown, though there may be more or less, dependent upon circumstances, and at one end of the shelf is a block 20, provided with grooves corresponding in number to the number of cases, which grooves receive tongues 21 on the latter to preclude displacement. The other ends of the cases are provided with recesses, which receive pins on the shelf to hold the cases in position. The cases abut at one end against said block, but the other ends of said cases terminate short of the side of the box, and in the space so provided is arranged a rock-plate 22, which is mounted on a short shaft 23, journaled in bearings on the inner side of the box. From the outer end of said shaft extends an arm 24, which is connected with the plate 14 by a rod 25. The rock-plate is provided with a number of spring-arms 26 26, which are secured at their lower ends to said rock-plate, while their upper ends are free and normally extend outwardly from the plate in the direction of the register-cases. Headed screw-stops 27 27 limit the outward movement of the spring-arms and provide a ready means for adjusting the position of the latter.

The register-cases are each comprised of a backing-piece 28 and a base-piece 29, to which pieces are secured registering mechanisms 30 30, in number dependent upon the number of offices for which the votes are to be cast. Each of these mechanisms is inclosed in a rectangular casing 31, provided with a removable cover 32, in which are arranged openings 33 34, covered with glass, through which the results can be readily seen. In the drawings I have shown, in connection with the other parts of the mechanism, a units-wheel 35 and a hundreds-wheel 36, and these two wheels, which are numbered as shown, will suffice for districts where the vote is comparatively light. It is evident, however, that additional wheels may be provided to secure the registration of any number of votes, however large, as by the inclusion of a third or thousands wheel the capabilities of the machine are largely increased. The units-wheel 35 is centrally mounted and is provided on its periphery with one hundred teeth of ratchet shape, while the hundreds-wheel is mounted to the rear of the units-wheel and is of smaller diameter, but provided with similar-shaped teeth, less in number, but preferably of larger size. The units-wheel is provided with an inwardly-projecting pin 37, which at each complete revolution engages a tooth on the hundreds-wheel and moves the latter a distance of one tooth, as will be understood. Back movement of these wheels is prevented by the employment of pawls 38 39, which engage the shoulder of a tooth in the usual manner. The pawl 39 for the hundreds-wheel is of peculiar construction in that its engaging end is substantially V-shaped and operates not only to prevent back movement of said wheel, but also to insure the forward movement thereof a distance of one tooth at each complete revolution of the units-wheel by the centering effect of the V-shaped surface on the ratchet-teeth. The units-wheel is caused to move a distance equal to the space between two of its teeth by the action of a vertically-movable key-bar 40, which carries a spring-actuated dog 41, adapted when the key-bar is depressed to engage a tooth on the wheel and move the latter, as stated. The key-bar is normally raised by a spring 42, its upward movement being limited by a stop-screw 43, while its lower end is shouldered to abut against the lower side of the casing, and thereby to limit its downward movement for the purpose of accurately controlling the movement of the units-wheel. The key-bar is extended beyond the top of the casing and is provided with a button 44 for convenient manipulation. Said key-bar is also provided with a notch 45, the upper side of which is inclined, as shown, and above said notch is a notch 46, which is comparatively shallow. In the opposite side of the key-bar is a depression 47, the lower side of which is in the same plane as the lower side of the notch 45. The covers 32 are provided with upper flanges 48, which extend over the casing-tops and provide a space in which are slidably arranged a number of locking-bars 49 49, one for each casing. Each of these bars is cut away at one end to accommodate a key-bar, and the shoulder 50, formed thereby, coöperates with the notches 45 46 in a manner presently to be explained. The other end of the bar normally rests opposite the depression 47 and serves to lock the key-bars against being moved when any one key-bar in a register-case is depressed. Each of the bars contacts with the end of the next adjacent bar to insure of their being simultaneously moved to unlock the key-bars by the action of the rock-plate, which action is hereinafter described. The reduced lower end 51 of each key-bar passes through an aperture in the bottom of the case, and means are provided for initially locking the key-bars, said means consisting of a bar 52, slidably arranged between the base-piece of the case and the bottom of the casing and provided with openings 53, which may register with the ends 51, but which are normally out of line therewith, to provide stops against the movement of said key-bars. This bar 52 projects at one end beyond the case and has an extension 54, between which and the end of the base-piece is confined a coiled spring 55, which operates to move the bar outwardly to bring the openings in register with the key-bar ends 51. As will presently appear, this bar 52 is in the operation of the machine moved but a slight distance, or sufficiently only to normally lock the key-bars against being depressed; but a greater range of movement of said bar is effected after the machine shall have performed its functions, and means are provided for locking said bar when moved to its extreme limit, which means consist of a hidden spring-catch 56, which is adapted to engage a slot 57 in the bar and which can be disengaged therefrom only by entirely removing one of the casings from the case.

The register-cases correspond in number to the number of candidates and, as will presently appear, can be manipulated separately. For the purpose of securing a registration of a vote for a "straight ticket" I employ a series of separate keys 58 58, each of which is arranged on the end of an arm 59, secured to a rock-shaft 60, mounted in bearings in a removable frame 61, which covers the register-cases. Secured to the rock-shaft 60 are fingers 62 62, corresponding in number to the number of register-cases employed, which fingers engage pins 63 on the key-bars and cause the latter to be moved coincidently with the movement of the keys 58.

The operation is as follows: The machine is prepared for operation by displaying in the machine, in any suitable or preferred manner, the list of offices and the names of the candidates therefor and by adjusting the registering mechanisms to show no count. The different parts of the machine are then severally locked by the persons holding the separate keys until such time as the votes are to be cast. When such time arrives, the holders of the keys must coöperate to open the machine, which is accomplished by first unlocking the cover of the casing, then by unlocking and swinging the casing-door around against the casing-side, where it is there secured by means of the lock $4^a$ and staple $2^a$, and then by unlocking the box-cover. A person is then free to step upon the platform and to be thereby within easy reach of the keys, which project normally slightly above the frame and which may be moved downward when released by a slight pressure from the finger. On or adjacent to the keys are displayed the names of the candidates, and on the rear upright of the frame appear the names and emblems of the parties, and to the side of the keys are displayed the offices for which the candidates are named. The disposition of the keys is similar to the disposition of the positions for marking on an "Australian" ballot and provide for voting "mixed," "scratch," and "straight" tickets by depressing the proper keys. In voting a straight ticket one of the keys 58 is depressed, and through the action of the fingers all of the keys of a row are moved downward to register the desired result. By the term "mixed ticket" is meant a ticket on which is indicated votes for the candidates of two or more different parties for different offices by the same voter, and by "scratched ticket" is meant a ticket on which the voter makes no indication of choice of the candidate of his political party for a particular office, but does indicate his choice for other offices. With the platform in an elevated position all of the keys are initially locked against depression through the action of the bar 52, which latter is forced inward against the action of its spring 55 by the lower end of the rock-plate 22, which lower end is moved inward through the described connection with the now elevated spring-actuated plate. A person entering the casing places his weight on the platform, which is thereby depressed, and the plate is, through its connection with the platform, also lowered, with the result of rocking the plate 22 and releasing the key-bars. The keys being free are then manipulated in the manner previously described to register the vote of the person, and after such manipulation any attempt, either wilful or otherwise, to change the result is met with failure, as the depressed keys, as well as the remaining elevated keys, will be found locked against movement. This locking of the keys after manipulation is effected by the operation of the bars 49, which, as previously stated, normally rest opposite the depressions 47 in the key-bars, but which are moved to engage said depressions through the rock-plate 22. This rock-plate, which is adjustably secured to the shaft, is moved to cause its upper end to engage the bars 49, and its lower end is moved outward to release the bar 52 and allow of its being moved by the action of its spring to free the key-bars. The bars 49 are engaged by the spring-arms 26, which have sufficient tension to move the bars without being compressed, and such movement, as before stated, prevents the bars from engaging in the depressions in the key-bars, with the result that said key-bars are free and may be moved downward to effect the registration. Pressure being applied, a key-bar is moved downward, the inclined upper side of its notch 45 engaging the shoulder 50 of a bar and forcing the latter outwardly against the action of the spring-arms 26 until the notch is passed, when such spring action forces the shoulder into the notch 46 and holds the key-bar in its depressed position. The simultaneous movement imparted to the bars 49 by the engagement of the inclined side of a notch 45 with one of the shoulders 50 causes the opposite ends of the bars to enter the depressions in the other key-bars on the right of the depressed key-bar, with the result of locking the same against movement, and such locking effect is obtained after any one of the keys in a register-case is depressed.

For convenience in describing the operation of voting I have numbered the keys alphabetically, beginning at the letter "A." Supposing a mixed ticket is to be voted, a person depresses, for instance, key "A" in the first row, whereupon keys "B," "C," and "D" are locked. Then "F" in the next row is depressed, whereupon keys "E," "G," and "H" are locked, and finally "K" in the third row is depressed, the keys "I," "J," and "L" being locked. If a person desires to vote a straight ticket, one of the keys 58 is depressed, with the result of moving all of the keys of a longitudinal row, or, say, those lettered "A," "E," and "I," for example.

A person stepping off of the platform restores the parts to their normal position, all of the depressed keys being released and elevated by their springs 42, the releasing of the keys being accomplished by the return movement of the rock-plate, which releases the bars 49 and engages and moves the bar 52 to its locking position.

After the poll is completed the stop-arm 17 is raised and the door 4, being unlocked, is moved away from the side 2, which carries the stop-button 18 out of the path of the plate 14, which latter, being free, is raised by the action of the springs 15 to its full limit, with the result of forcing the bar 52 inward to be engaged by the catch 56, which secures the locking of the keys against movement until the catch is released by moving one of the register-casings in the manner previously described. The frame is then removed and the register-cases are taken out and the results ascertained by a glance at the register-wheels through the openings, which wheels are provided with suitable pointers to show the number of registrations obtained.

I claim as my invention—

1. In a machine of the character described, the combination with registering mechanisms each comprising a numbered wheel, and a numbered wheel or wheels adapted to be moved at each complete revolution of the first-named wheel, key-bars each of which is adapted to be depressed to engage and partially rotate said first-named wheel, a spring-actuated bar normally in the path of the lower ends of the key-bars to lock the same, a slide-bar near the upper ends of the key-bars and a rock-plate controlled by the weight of a person for moving the lower bar to release the key-bars and for adapting the upper slide-bars for locking the key-bars when depressed substantially as described.

2. In a machine of the character described, the combination with registering mechanisms each comprising a numbered wheel and a numbered wheel or wheels adapted to be moved at each complete revolution of the first-named wheel, key-bars each of which is provided with a spring-actuated dog adapted when the key-bar is depressed to engage and partially rotate the first-named wheel, a spring-actuated bar normally in the path of the lower ends of the key-bars to lock the same, a slide-bar near the upper ends of the key-bars, and a rock-plate adapted to be actuated by the weight of a person to cause its lower end to move the lower bar to release the key-bars, and provided at its upper end with a spring-finger which is brought by the movement of the rock-plate against the upper bar to impart to the latter a spring action to cause it to engage and lock the key-bars on being depressed, substantially as described.

3. In a machine of the character described the combination with registering mechanism and a key-bar for operating the same, of a spring-actuated slide-bar normally in the path of the lower end of said bar provided with an aperture which by a partial movement of the bar is brought into line with the key-bar to release the same, and a spring-catch for locking the bar at the end of its extreme movement, substantially as described.

4. In a machine of the character described, the combination with a registering mechanism, and with a key-bar provided with the depression and notches as described, of a spring-actuated locking-bar normally in the path of the lower end of the key-bar, and an upper locking-bar normally resting opposite the depression, a rock-plate one end of which engages the spring-actuated bar, and the other end of which is provided with spring-arms arranged in the path of the upper bar, and means for actuating said rock-plate, controlled by the weight of a person, for releasing said key-bar and for permitting the upper locking-bar to coöperate with the key-bar notches, substantially as described.

5. In a machine of the character described, the combination with a casing constructed as described and provided with a pivoted platform at its base, of a hinged plate connected with said platform and provided with springs to elevate it and the platform, a stop adapted when the casing is opened to project in the path of the plate, a rock-plate adjustably secured to a shaft having connection with the plate, key-operated registering mechanisms, and means for releasing and locking said mechanisms operated by the rock-plate, substantially as described.

NAPOLEON B. ROSS.

Witnesses:
M. O. AGNEW,
P. C. STATELER.